United States Patent
Sato et al.

(10) Patent No.: US 6,332,451 B1
(45) Date of Patent: Dec. 25, 2001

(54) ROTARY VALVE ACTUATOR ARRANGEMENT

(75) Inventors: Hisaaki Sato, Gunma; Masato Kumagai, Saitama; Tomoaki Araki; Keiichi Kai, both of Gunma, all of (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/593,304

(22) Filed: Jun. 13, 2000

(30) Foreign Application Priority Data

Jun. 16, 1999 (JP) .................................................. 11-170313

(51) Int. Cl.[7] ...................................................... F02D 9/02
(52) U.S. Cl. ................................................................ 123/399
(58) Field of Search ...................................... 123/361, 399

(56) References Cited

U.S. PATENT DOCUMENTS

| | | | |
|---|---|---|---|
| 5,275,141 | * 1/1994 | Tsunoda et al. | ........................ 123/399 |
| 5,752,584 | * 5/1998 | Apel | ........................ 123/399 |
| 5,823,165 | 10/1998 | Sato et al. | ........................ 123/399 |
| 5,996,554 | * 12/1999 | Tojo et al. | ........................ 123/399 |
| 6,116,215 | * 9/2000 | Soleanicov | ........................ 123/399 |
| 6,239,562 | * 5/2001 | Turner | ........................ 123/399 |

* cited by examiner

*Primary Examiner*—Erick Solis
(74) *Attorney, Agent, or Firm*—Foley & Lardner (57) ABSTRACT

A rotary valve actuator arrangement including a rotary valve and an electromagnetic actuator actuating the rotary valve. The rotary valve includes a valve shaft rotatable about an axis and a valve body disposed on the valve shaft for unitary rotation therewith. The electromagnetic actuator includes two stator cores, two coils wound on the stator cores, and a rotor rotatable about the axis and including two projecting portions opposed to the stator cores. Mutually opposed surfaces of the stator cores and the projecting portions define a continuously variable area forming a magnetic path when the coil is energized.

42 Claims, 9 Drawing Sheets

ROTARY VALVE ACTUATOR ARRANGEMENT

BACKGROUND OF THE INVENTION

Field of the Invention

The present invention relates to a rotary valve actuator arrangement for an automobile engine, and more particularly to a throttle valve actuator arrangement useable for variably controlling an amount of intake air induced to the engine depending on an amount of manipulation of an accelerator.

U.S. Pat. No. 5,823,165 discloses an electric-driven throttle valve actuator arrangement. The arrangement includes a casing having an intake air passage, a valve shaft rotatably disposed within the casing, a valve body rotatable with the valve shaft to open and close the intake air passage, an electromagnetic actuator for driving the valve body via the valve shaft, and a pair of springs for biasing the valve body toward the closed position or the intermediate position between the closed position and the full open position. The electromagnetic actuator includes a stator disposed on the casing and a rotor disposed on the valve shaft. The stator includes a stator core and a pair of coils wound on the stator core in opposite directions. The rotor includes a disk fixed to one end of the valve shaft, a permanent magnet fixed to the disk in an opposed relation to the stator core. The stator core, the rotor and the respective coils cooperate to generate opposite magnetic fields acting for moving the valve body toward the full open position and the closed position when the coils are energized, respectively. The rotation of the valve body is restricted at the closed position and the full open position by contact of a stopper piece of a lever attached on the valve shaft with two stoppers projecting from the casing. When one of the coils is activated with a pulse current in a variable duty ratio, the valve shaft can be rotated depending on an opening degree of the valve body corresponding to the duty ratio. The valve body thus rotates with the valve shaft to open and close the induction passage in the casing so that the amount of the intake air can be variably controlled.

SUMMARY OF THE INVENTION

Permanent magnets used in such a conventional electromagnetic actuator as described above are expensive because of the great magnetic power. Further, since the disk is used for attaching the permanent magnet to the valve shaft, the number of components of the electromagnetic actuator is increased so that the cost performance is reduced.

Furthermore, for example, in the assembly line of the throttle valve actuator, a plurality of permanent magnets tend to be gathered by the attraction therebetween to form a mass. The permanent magnets must be separated from each other by the line workers against the large attraction, and then be mounted onto the valve shaft side. This leads to the troublesome assembly work.

The present invention contemplates to solve the above-described disadvantages or problems in the conventional technique. Specifically, it is an object of the present invention to provide a rotary valve actuator arrangement capable of reducing the number of parts of the rotary valve actuator and therefore saving the production cost, and improving efficiency in the assembly work.

According to one aspect of the present invention, there is provided a rotary valve actuator arrangement, comprising:

a casing having an intake air passage;

a rotary valve disposed within said casing, said rotary valve including a valve shaft rotatable about an axis and a valve body disposed on said valve shaft and rotatable therewith to open and close the intake air passage, said valve body having a closed position and a full open position; and an electromagnetic actuator moving said valve body toward the full open position, said electromagnetic actuator including a stator core, a coil wound on said stator core, and a rotor opposed to said stator, said rotor being fixed to said valve shaft, said rotor having a valve-closing position corresponding to the closed position of said valve body and a valve-opening position corresponding to the full open position of said valve body;

said stator core and said rotor cooperating to generate a magnetic field passing therethrough upon said coil being energized, said rotor being rotatably moved toward the valve-opening position by a magnetic attraction caused by the magnetic field.

According to a further aspect of the present invention, there is provided a rotary valve actuator arrangement, comprising:

a rotary valve including a valve shaft rotatable about an axis and a valve body disposed on said valve shaft for unitary rotation therewith, said valve body having a closed position and a full open position; and an electromagnetic actuator actuating said rotary valve, said electromagnetic actuator comprising:

a coil;

a stator core supporting said coil and having a first surface; and a rotor rotatable about said axis between a valve-closing position corresponding to the closed position of said valve body and a valve-opening position corresponding to the full open position of said valve body, said rotor having a second surface opposed to said first surface to define a continuously variable area that forms a magnetic path upon energization of the coil.

DESCRIPTION OF THE PREFERRED EMBODIMENT

First through third embodiments of a rotary valve actuator arrangement according to the present invention will be explained hereinafter with the accompanying drawings. In these embodiments, the arrangement is applied to a throttle valve actuator for a throttle valve of an automobile engine.

Referring now to FIGS. 1–5, the first embodiment of the invention is explained.

Figure 1:
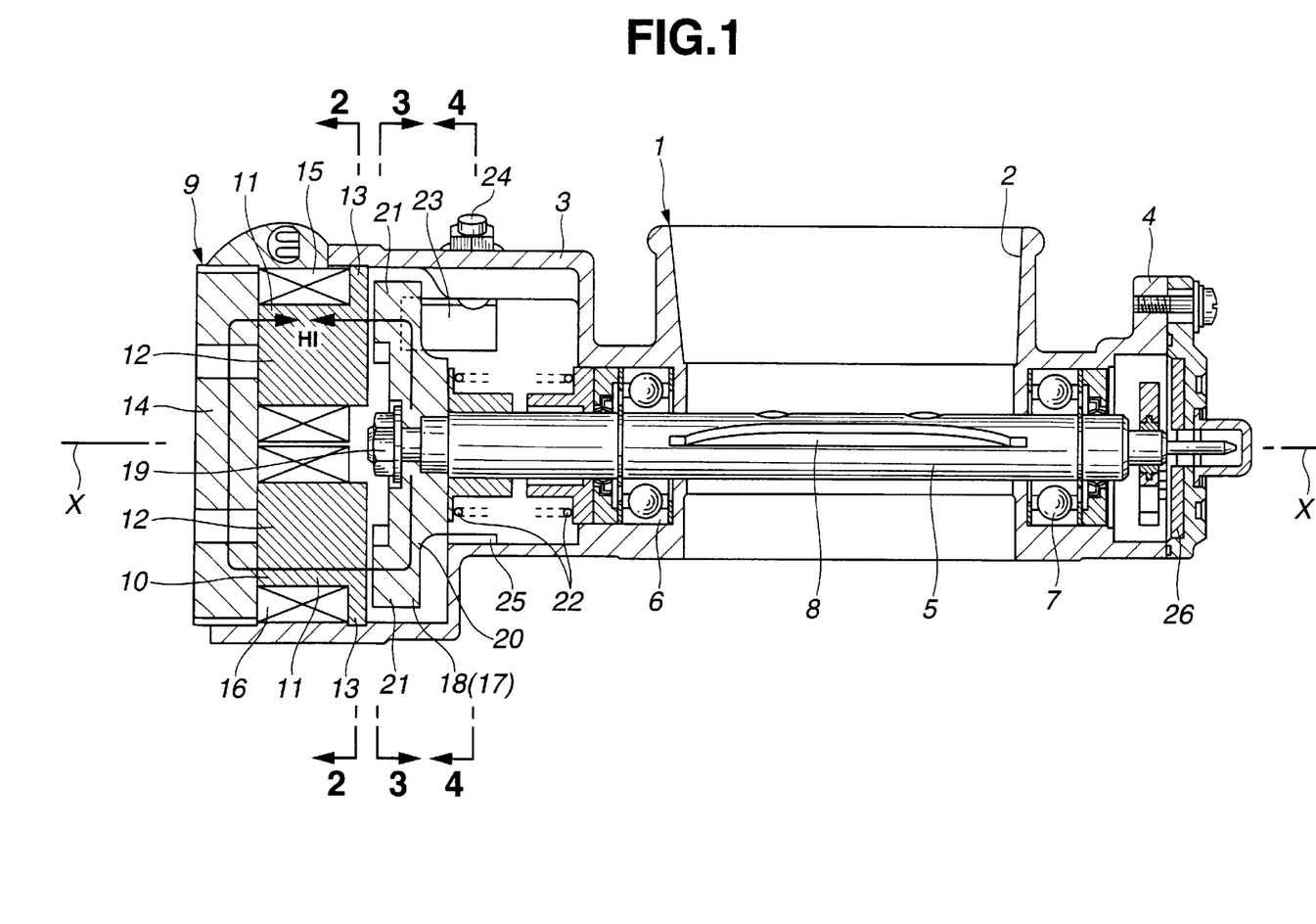
FIG. 1 is a section of a rotary valve actuator arrangement of a first embodiment, according to the present invention, taken in a longitudinal direction.

As illustrated in FIG. 1, the throttle valve actuator arrangement includes a casing 1. The casing 1 includes a throttle valve casing defining a throttle chamber 2 forming an intake air passage connected to an induction pipe, not shown. The casing 1 also includes an actuator casing 3 for an electromagnetic actuator 9 and a sensor casing 4 for a throttle sensor 26. The actuator casing 3 and the sensor casing 4 are disposed on opposite sides, i.e., the left and right sides as viewed in FIG. 1, of the throttle valve casing. The actuator casing 3 defines an actuator chamber extending substantially perpendicular to the throttle chamber 2. The actuator casing 3 has a generally cylindrical shape and includes a bottom wall having a bore and a circumferential side wall connected with the bottom wall. The side wall is formed with a shoulder portion for accommodating a rotor 17 of the electromagnetic actuator 9. The actuator casing 3 and the sensor casing 4 are integrally formed with the throttle valve casing by a suitable method such as aluminum die casting.

Figure 3:
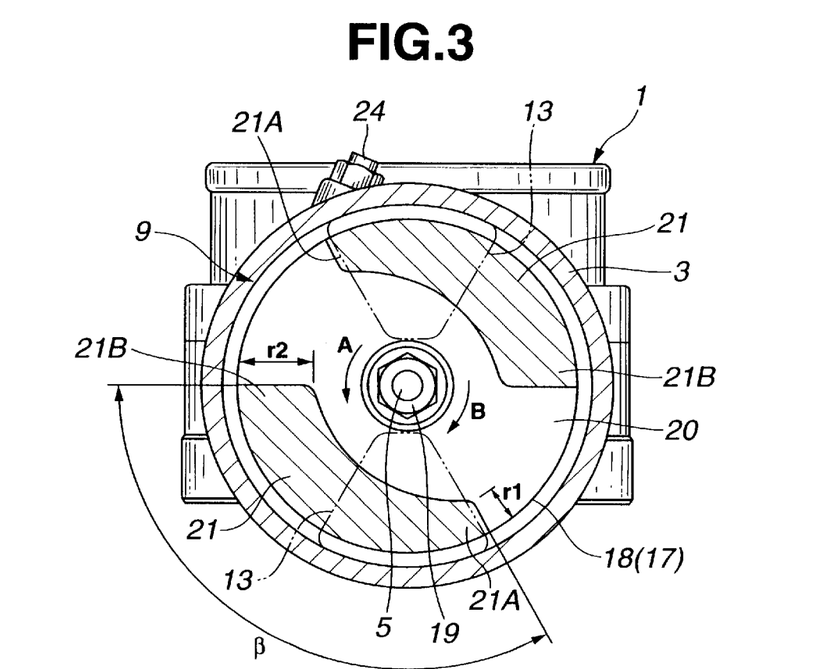
FIG. 3 is a cross section taken along the line 3—3 in FIG. 1, showing a rotor.

A valve shaft 5 is supported within the casing 1 by means of bearings 6 and 7 so as to be rotatable about an axis X. The valve shaft 5 extends across the throttle chamber 2 and has one end projecting into the actuator casing 3 through the bore of the bottom wall thereof and the other end projecting into the sensor casing 4. A valve body 8 is disposed on the valve shaft 5 within the throttle chamber 2. The valve body 8 is in the form of a disk plate having a diameter similar to a diameter of the throttle chamber 2. The valve body 8 rotates about the axis X together with the valve shaft 5 to move between a closed position and a full open position. As illustrated in FIG. 3, the valve shaft 5 with the valve body 8 moves toward the full open position upon rotating in a direction A and moves toward the closed position upon rotating in a direction B. The valve body 8 blocks intake air flowing through the throttle chamber 2 into the engine at the closed position and allows the flow of intake air at the full open position. An amount of the intake air flow can be variably controlled by the rotating motion of the valve body 8.

Figure 2:
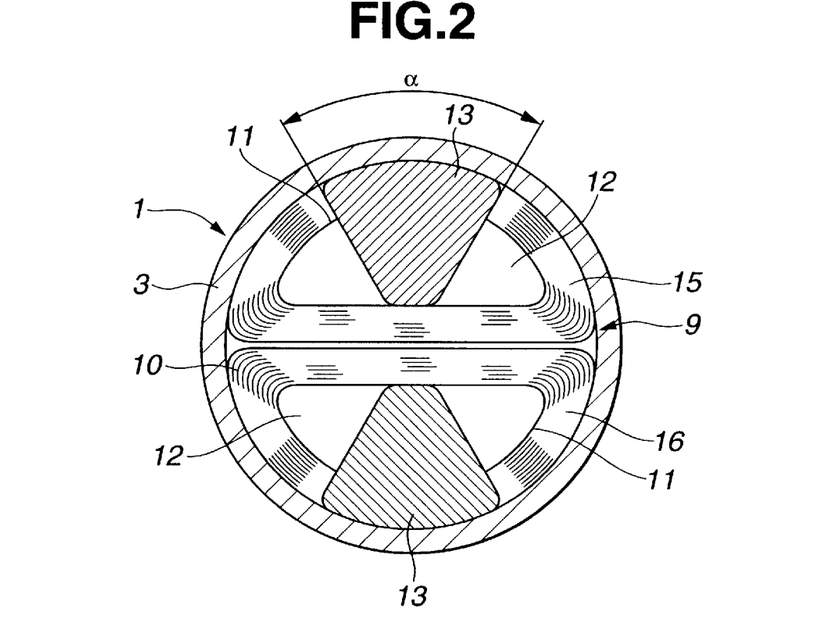
FIG. 2 is a cross section taken along the line 2—2 in FIG. 1, showing a stator.
Figure 5:
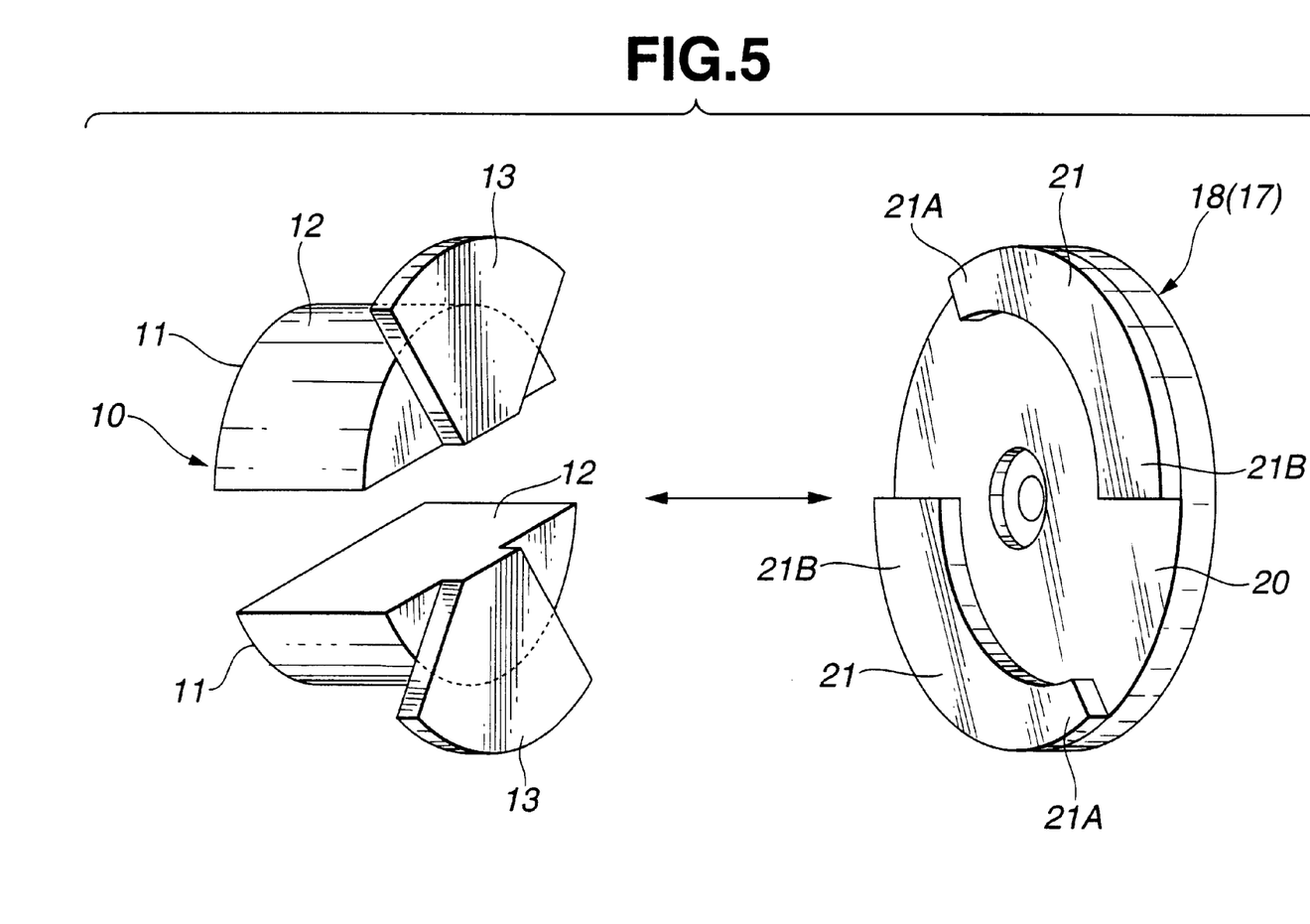
FIG. 5 is a perspective view of a stator core and the rotor before assembly.

The electromagnetic actuator 9 within the actuator casing 3 includes a stator 10. The stator 10 includes a pair of stator cores 11, 11 and a pair of coils 15 and 16 supported by the respective stator cores 11, 11. The coils 15 and 16 are wound on the coil mounting portions 12 of the stator cores 11 in opposite directions. The stator cores 11 are diametrically opposed to each other with respect to the axis X of the valve shaft 5. Each stator core 11 is made of a suitable soft magnetic material, for example, silicon steel, permalloy, ferrite and the like, which has a relatively small coercive force. The stator core 11 includes a coil mounting portion 12 axially extending and a pole piece portion 13 radially outwardly extending from the coil mounting portion 12. The pole piece portion 13 is integrally formed with the coil mounting portion 12. The coil mounting portion 12 is formed into a semi-cylindrical shape as shown in FIGS. 2 and 5 and fixed to a core connecting plate 14 as shown in FIG. 1. The core connecting plate 14 magnetically connects the two stator cores 11. The core connecting plate 14 is secured to an open end of the actuator casing 3, acting as a lid of the actuator casing 3. The core connecting plate 14 is made of a suitable soft magnetic material similar to the material of the stator cores 11. The pole piece portion 13 has an axial end surface radially extending around the axis X of the valve shaft 5. As best shown in FIG. 2, the axial end surface has a generally sectorial shape having a predetermined central angle α, for instance, approximately 40–80 degrees, about the axis X of the valve shaft 5. The axial end surface of the pole piece portion 13 faces the rotor 17.

The rotor 17 of the electromagnetic actuator 9 is rotatable about the axis X of the valve shaft 5. The rotor 17 has a valve-closing position corresponding to the closed position of the valve body 8 and a valve-opening position corresponding to the full open position of the valve body 8. The rotor 17 includes a generally disk-shaped rotor core 18 secured to the one end of the valve shaft 5. Similar to the stator cores 11, the rotor core 18 is made of a suitable soft magnetic material such as silicon steel, permalloy and ferrite. The rotor core 18 includes an annular mount portion 20 fixed to the one end of the valve shaft 5 by means of a fastening nut 19. The mount portion 20 radially outwardly extends at the one end of the valve shaft 5. The rotor core 18 also includes two projecting portions 21, 21 extending from the mount portion 20 in the axial direction of the valve shaft 5. The projecting portions 21, 21 are integrally formed with the mount portion 20 and diametrically opposed to each other with respect to the axis X of the valve shaft 5. Each projecting portion 21 has an axial end surface at least partly opposed to the axial end surface of the pole piece portion 13 of the stator core 11 with a small axial clearance therebetween. Namely, the axial end surface of the projecting portion 21 is at least partly covered with the axial end surface of the pole piece portion 13 when viewed in the axial direction of the valve shaft 5. The axial end surface of the projecting portion 21 opposed to the axial end surface of the pole piece portion 13 defines a continuously variable area forming a magnetic path upon energization of the coils 15 and 16, as explained later. The rotor 17 is caused to rotate in the direction A by the continuous variation of the area upon energization of the coils 15 and 16.

Specifically, as illustrated in FIG. 3, the axial end surface of the projecting portion 21 radially extends around the axis X of the valve shaft 5. The axial end surface of the projecting portion 21 is formed into a generally part-sectorial shape having a predetermined central angle β, for instance, approximately 90–130 degrees, about the axis X of the valve shaft 5. The axial end surface of the projecting portion 21 has a radial length smaller than that of the axial end surface of the pole piece portion 13. The axial end surface of the projecting portion 21 is tapered in the direction A toward the valve-opening position of the rotor 17. The axial end surface of the projecting portion 21 gradually increases in the direction B toward the valve-closing position of the rotor 17. The axial end surface of the projecting portion 21 has one small end 21A having a radial length r1 and an opposite large end 21B having a radial length r2 greater than the radial length r1. When the rotor 17 is placed in the valve-closing position, namely, the closed position of the valve body 8, as shown in FIG. 3, the small end 21A side of the axial end surface of the projecting portion 21 is opposed to the axial end surface of the pole piece portion 13 of the stator core 11. In this state, the area of the mutually opposed axial end surfaces of the projecting portion 21 and the pole piece portion 13 is the minimum. On the other hand, the rotor 17 is placed in the valve-opening position, namely, the full open position of the valve body 8, the large end 21B side of the axial end surface of the projecting portion 21 faces the axial end surface of the pole piece portion 13. In such the case, the area of the mutually opposed axial end surfaces of the projecting portion 21 and the pole piece portion 13 is the maximum.

The stator cores 11, the rotor 17 and the core connecting plate 14 cooperate to form a magnetic circuit upon energization of the coils 15 and 16, so that a magnetic field Hi passing therethrough is generated as shown in FIG. 1. There is a magnetic path extending between the pole piece portions 13 of the stator cores 11 and the projecting portions 21 of the rotor core 18. The magnetic path is formed by the area of the mutually opposed axial end surfaces of each pole piece portion 13 and each projecting portion 21. A magnetic flux extends through the area from the pole piece portion 13 to the projecting portion 21. As the area of the mutually opposed axial end surfaces becomes larger, an amount of the magnetic flux extending through the area increases. The increasing magnetic flux causes a magnetic attraction between the stator cores 11 and the rotor core 18, whereby a magnetic driving force is applied onto the rotor core 18. The rotor 17 is thus driven by the driving force to rotate in the direction A shown in FIG. 3. Thus, the direction in which the area of the mutually opposed axial end surfaces of the pole piece portion 13 and the projecting portion 21 increases is same as the direction A toward the valve-opening position of the rotor 17.

Referring back to FIG. 1, a return spring 22 is disposed between the bottom wall of the actuator casing 3 and the rotor 17. The return spring 22 always biases the valve body 8 toward the closed position via the valve shaft 5 and the rotor core 18.

Figure 4:
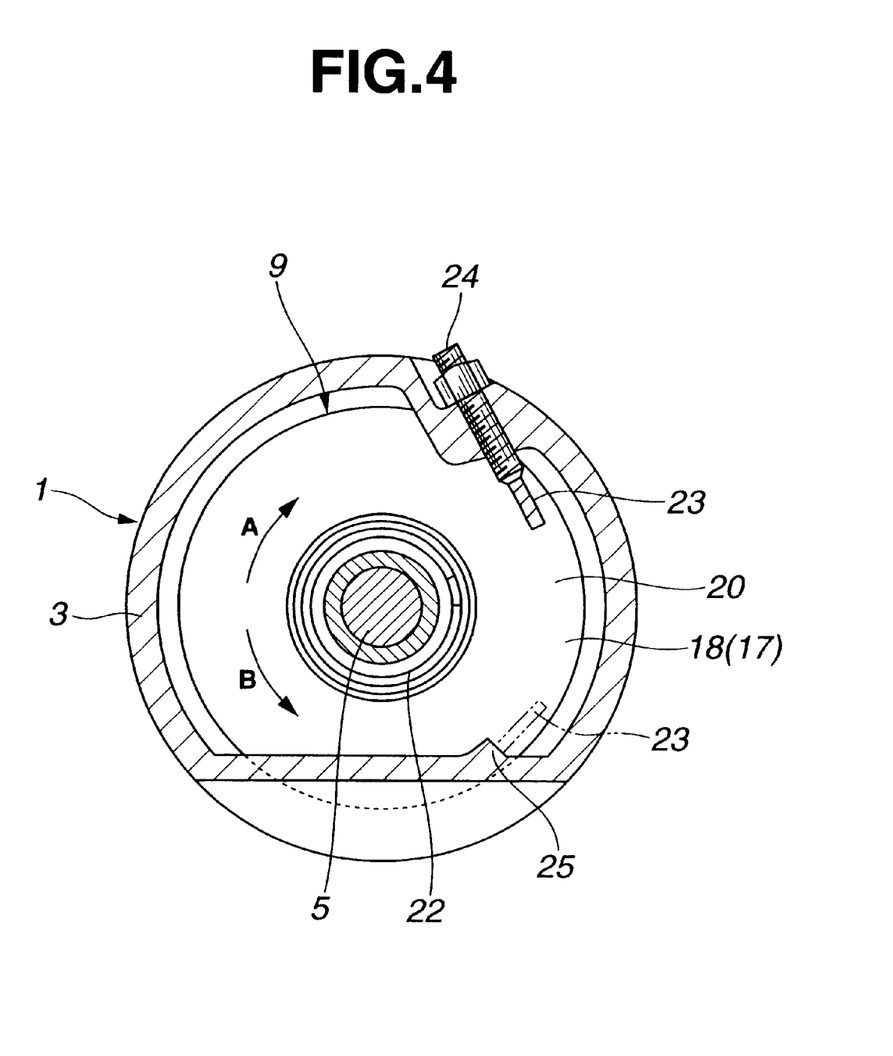
FIG. 4 is a cross section taken along the line 4—4 in FIG. 1, showing the rotor.

A stopper 23 made of sheet metal is fixed to the mount portion 20 of the rotor core 18. The stopper 23 limits the rotating motion of the rotor 17 at the valve-closing and valve-opening positions in cooperation with associating stoppers 24 and 25 disposed on the side wall of the actuator casing 3. The stopper 24 is in the form of an adjusting screw attached to the side wall of the actuator casing 3 and the stopper 25 is in the form of a projection radially inwardly projecting from the side wall thereof. As illustrated in FIG. 4, the stopper 23 is contacted with the adjusting screw 24 when the rotor 17 is urged by the return spring 22 in the direction B and placed in the valve-closing position. The stopper 23 is contacted with the projection 25 when the rotor 17 is moved in the direction A and placed in the valve-opening position upon energization of the coils 15 and 16.

As illustrated in FIG. 1, a throttle sensor 26 is mounted to the sensor casing 4. The throttle sensor 26 is formed by a potentiometer and detects an opening degree of the valve body 8 as a rotating angle of the valve shaft 7.

The thus-constructed throttle valve actuator arrangement operates in the following manner.

First, when the coils 15 and 16 are in a deenergized state, the rotor 17 is in the valve-closing position where the stopper 23 is in contact with the adjusting screw 24 by the spring force of the return spring 22. The valve body 8 is placed in the closed position.

When the coils 15 and 16 are activated with pulse currents in response to an output signal from an engine control unit (not shown), a magnetic circuit is formed by the stator cores 11, the core connecting plate 14 and the rotor core 18 and the magnetic field H1 passes therethrough as shown in FIG. 1. In this condition, the magnetic flux extends from the pole piece portions 13 of the stator cores 11 to the projecting portions 21 of the rotor core 18 through the small axial clearance therebetween. The magnetic attraction caused by the magnetic flux becomes greater in such the direction that the area of the mutually opposed axial end surfaces of the respective projecting portion 21 and the respective pole piece portion 13 increases. The magnetic attraction acts as the driving force applied to the rotor core 18. The rotor 17 is then driven to rotate with the valve shaft 5 toward the valve-opening position against the spring force of the return spring 22. The rotor 17 is moved to a position where the driving force applied to the rotor core 18 counterbalances the spring force of the return spring 22. The valve body 8 is then placed in the open position corresponding to the position of the rotor 17. The engine control unit operates to vary the duty ratio between the pulse currents flowing through the coils 15 and 16. The driving force applied to the rotor core 18 is thus variably adjusted depending on the variation of the duty ratio. As a result, the opening degree of the valve body 8 is desirably controlled.

As be apparent from the above explanation, the electromagnetic actuator 9 of the present invention dispenses with a permanent magnet and a disk for mounting the permanent magnet as described in the conventional technique. Accordingly, the arrangement of the present invention can contemplate reducing the number of parts of the electromagnetic actuator and the production cost thereof. Further, owing to the non-use of the permanent magnet having a large magnetic force, the assembly work of the electromagnetic actuator 9 can be facilitated.

Furthermore, the rotor core 18 is rotatably arranged relative to the stator cores 11 with the small axial clearance between the pole piece portions 13 and the projecting portions 21. This can serve for reducing the axial dimension of the electromagnetic actuator 9.

In addition, upon rotation of the valve shaft 5, the stopper 23 fixed to the rotor core 18 restricts the valve body 8 at the closed position by the contact with the adjusting screw 24 and at the full open position by the contact with the projection 25. As compared with the arrangement of the stopper piece of the lever attached on the valve shaft in the above-described conventional technique, the arrangement of the present invention can prevent the valve shaft 5 from directly receiving at the closed and full open positions a reaction force that is caused by the spring force of the return spring 22 and the driving force of the electromagnetic actuator 9. This can reduce a load applied to the valve shaft 5 and a slight torsion of the valve shaft 5 which is caused by the load applied thereto.

Referring to FIGS. 6–9, the second embodiment of the arrangement of the present invention will be explained hereinafter. Like reference numerals denote like parts and therefore detailed explanations therefor will be omitted. The second embodiment differs from the above first embodiment in the arrangement of the pole piece portions of the stator cores and the projections of the rotor core with a radial clearance therebetween.

Figure 6:
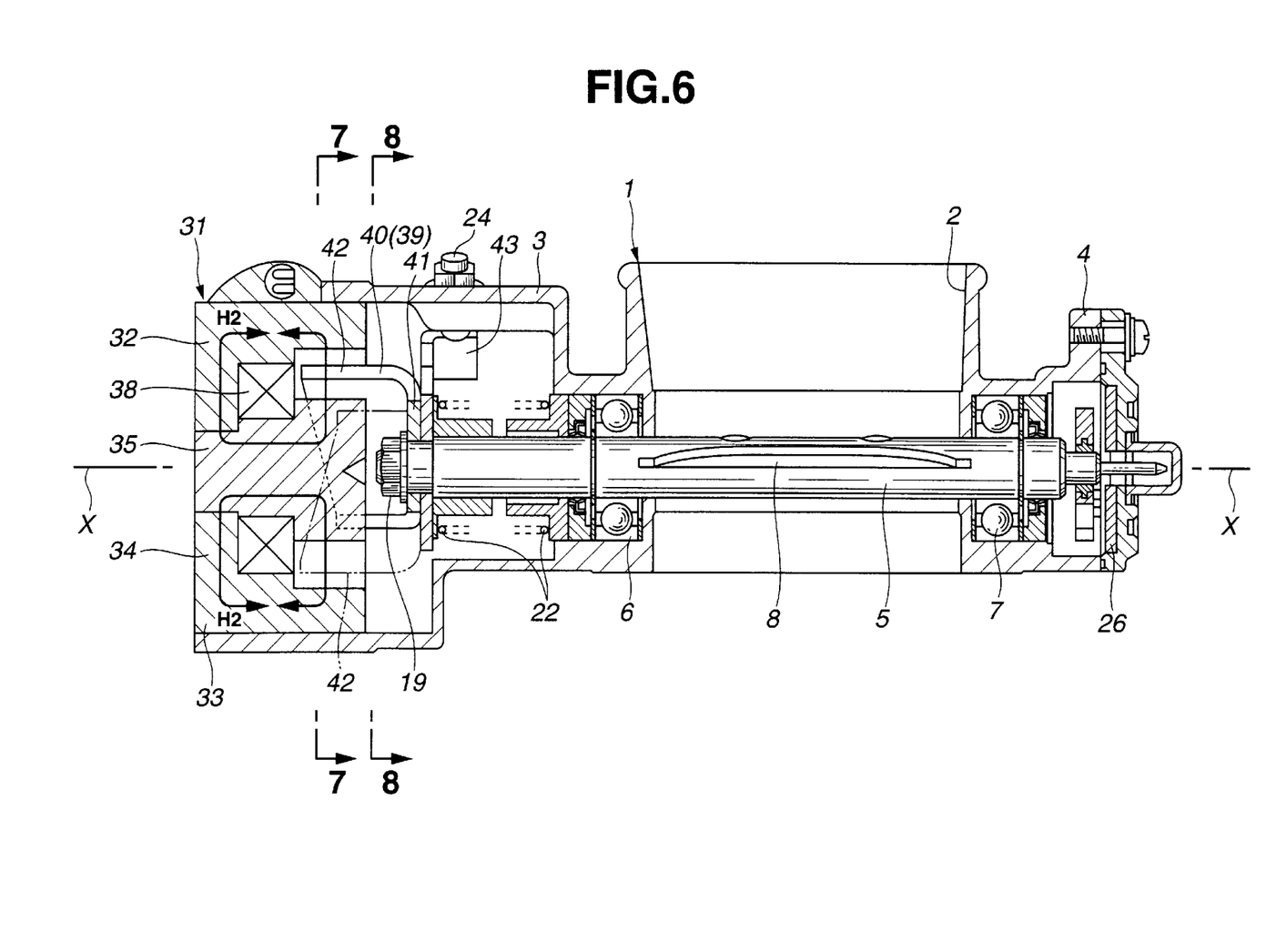
FIG. 6 is a section similar to FIG. 1, but showing the arrangement of a second embodiment, according to the present invention.
Figure 7:
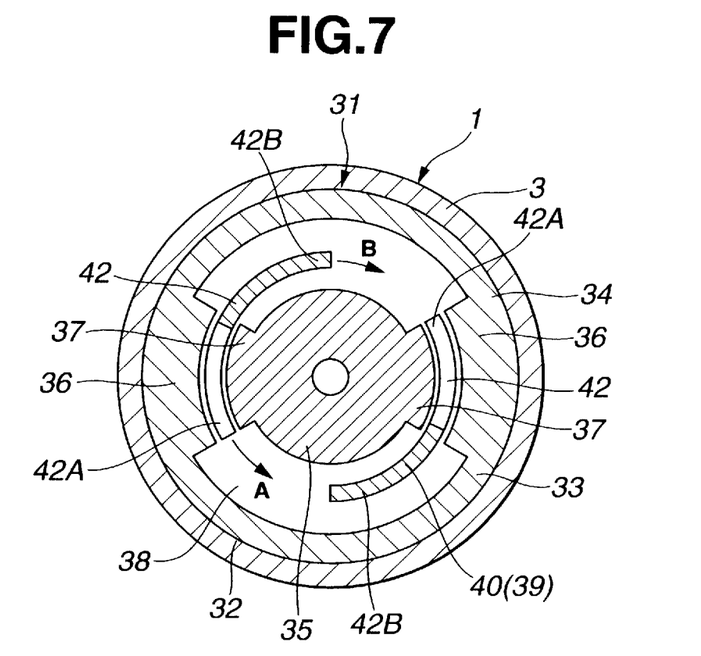
FIG. 7 is a cross section taken along the line 7—7 in FIG. 6, showing a stator and a rotor.
Figure 8:
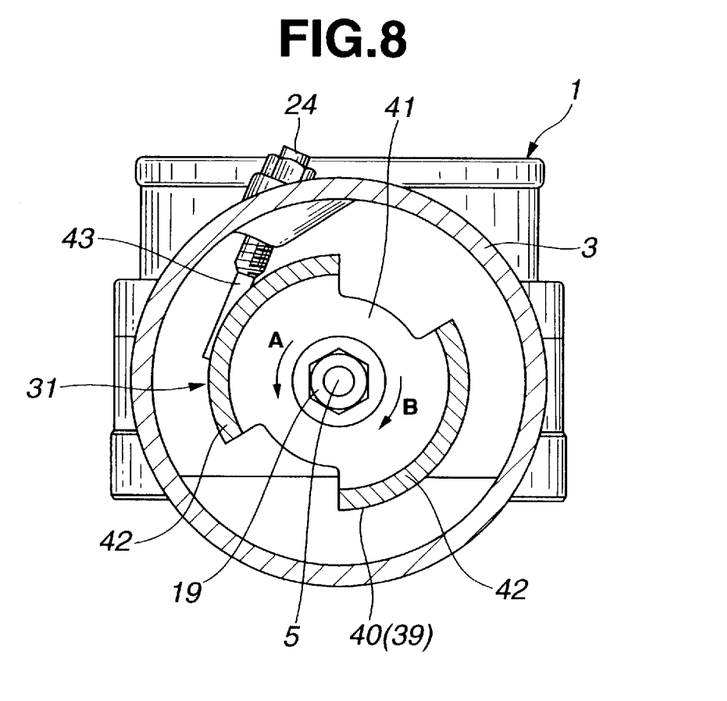
FIG. 8 is a cross section taken along the line 8—8 in FIG. 6, showing a rotor.

As illustrated in FIGS. 6 and 7, an electromagnetic actuator 31 includes a stator 32 and a rotor 39 rotatable relative to the stator 32, similar to the electromagnetic actuator 9 of the first embodiment. The stator 32 includes a stator core 33 made of a soft magnetic material as explained in the above first embodiment. The stator core 33 includes a hollow and generally cylindrical outer core 34 fitted into the actuator casing 3 and a two-stepped cylindrical inner core 35 fixedly disposed within the outer core 34. The outer core 34 has a bottom wall having a bore and a circumferential side wall connected with an outer periphery of the bottom wall. A reduced-diameter end portion of the inner core 35 is fitted to the bore of the bottom wall of the outer core 34. As illustrated in FIG. 7, the outer core 34 includes outer pole piece portions 36, 36 extending radially inwardly from an inner circumferential surface of the outer core 34. The outer pole piece portions 36, 36 are diametrically opposed to each other with respect to the axis X of the valve shaft 5. Each outer pole piece portion 36 has a circumferential surface having a part-cylindrical shape extending circumferentially over a predetermined angle, for example, 40–80 degrees, about the axis X of the valve shaft 5. The inner core 35 includes inner pole piece portions 37, 37 extending radially outwardly from an outer circumferential surface of the inner core 35. The inner pole piece portions 37, 37 are arranged in a diametrically opposed relation to each other corresponding to the outer pole piece portions 36, 36. Each inner pole piece portion 37 has a circumferential surface having a part-cylindrical shape extending circumferentially in an opposed relation to the circumferential surface of the outer pole piece portion 36. Each of the circumferential surfaces of the outer and inner pole piece portions 36 and 37 has opposed circumferential ends having a predetermined same axial length. There is a clearance radially extending between the opposed circumferential surfaces of the outer and inner pole piece portions 36 and 37 and extending along the axis X of the valve shaft 5 over the predetermined axial length. A radial length of the clearance is slightly larger than a thickness of projecting portions 42 of a rotor 39 explained later.

A coil 38 is disposed between the bottom wall side of the side wall of the outer core 34 and a reduced-diameter middle portion of the inner core 35 that has a diameter larger than the reduced-diameter end portion as shown in FIG. 6. The inner core 35 also includes an increased-diameter head portion having a diameter larger than the reduced-diameter middle portion.

Figure 9:
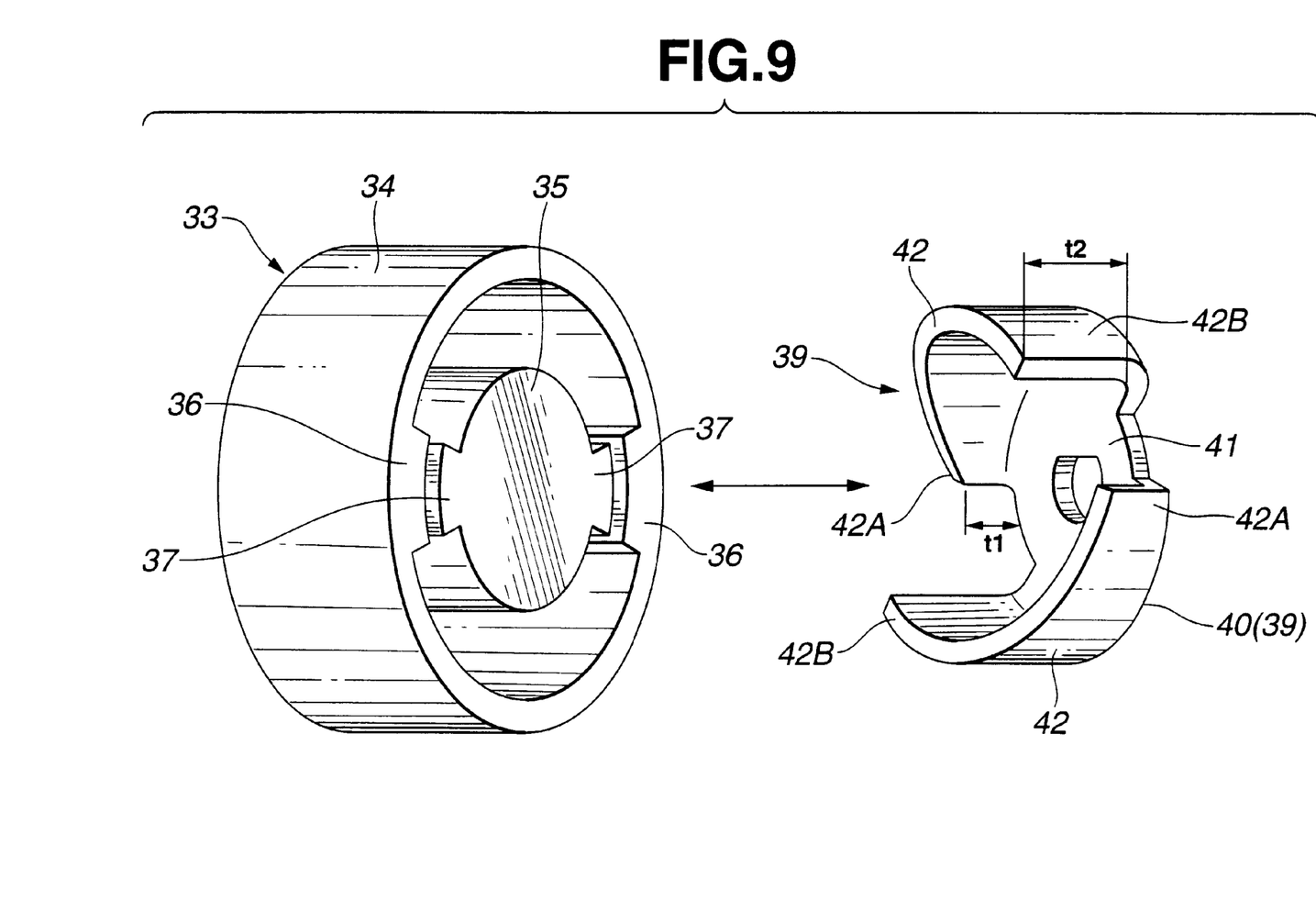
FIG. 9 is a perspective view of a stator core and the rotor of the second embodiment before assembly.

The rotor 39 includes a rotor core 40 fixed to the one end of the valve shaft 5. Similar to the rotor core 18 of the first embodiment, the rotor core 40 is made of a suitable soft magnetic material such as silicon steel, permalloy and ferrite. The rotor core 40 includes an annular mount portion 41 radially outwardly extending at the one end of the valve shaft 5 and the projecting portions 42, 42 extending from an outer periphery of the mount portion 41 in the axial direction of the valve shaft 5. The projecting portions 42, 42 are integrally formed with the mount portion 41. The projecting portions 42, 42 are arranged in a diametrically opposed relation as shown in FIG. 7. Each projecting portion 42 has one axial end connected with the outer periphery of the mount portion 41 at substantially a right angle relative thereto. The projecting portion 42 has an opposite axial end projecting into the radial clearance between the outer and inner pole piece portions 36 and 37 of the outer and inner cores 34 and 35. The projecting portion 42 is tapered as shown in FIG. 9, toward the valve-opening position of the rotor 39, namely, in the direction A shown in FIGS. 7 and 8. The projecting portion 42 has an axial length varying so as to increase toward the valve-closing position of the rotor 39, namely, in the direction B shown in FIGS. 7 and 8. As best shown in FIG. 9, the projecting portion 42 has a small circumferential end t2 having an axial length t1 and a large circumferential end 42B having an axial length t2 greater than the axial length t1.

The projecting portion 42 has outer and inner circumferential surfaces having a generally part-cylindrical shape circumferentially extending over a predetermined angle, for instance, approximately 90–130 degrees, about the axis X of the valve shaft 5. The outer and inner circumferential surfaces of the projecting portion 42 are tapered in the direction A toward the valve-opening position of the rotor 39. The outer circumferential surface of the projecting portion 42 is at least partly opposed to the circumferential surface of the outer pole piece portion 36 and the inner circumferential surface thereof is at least partly opposed to the circumferential surface of the inner pole piece portion 37. There are radial clearances between the outer circumferential surface of the projecting portion 42 and the circumferential surface of the outer pole piece portion 36 and between the inner circumferential surface of the projecting portion 42 and the circumferential surface of the inner pole piece portion 37, respectively. The mutually opposed circumferential surfaces of the projecting portion 42 and the outer and inner pole piece portions 36 and 37 define a continuously variable area forming a magnetic path upon energization of the coil 38. The areas of the mutually opposed circumferential surfaces of the projecting portion 42 and the outer and inner pole piece portions 36 and 37 is the minimum wherein the rotor 39 is in the valve-closing position shown in FIG. 7, and the maximum wherein the rotor 39 is in the valve-opening position. The rotor 39 is driven to rotate in the direction A by the continuous variation of the area of the mutually opposed circumferential surfaces of the projecting portion 42 and the outer and inner pole piece portions 36 and 37 upon energization of the coil 38.

When the coil 38 is energized, the outer core 34, the inner core 35 and the rotor core 40 cooperate to form a magnetic circuit so that a magnetic field H2 passes therethrough as shown in FIG. 6. In this condition, a magnetic path is formed by the area of the mutually opposed circumferential surfaces of the projecting portion 42 and the pole piece portions 36 and 37. A magnetic flux radially extends through the area between the outer and inner pole piece portions 36 and 37 and the projecting portions 42. As the areas of the mutually opposed circumferential surfaces of the projecting portion 42 and the pole piece portions 36 and 37 becomes greater, an amount of the magnetic flux extending through the area between the pole piece portions 36 and 37 and the projecting portions 42 increases. A magnetic driving force is caused by the increasing magnetic flux and applied to the rotor core 40 in such the direction that the magnetic flux increases. The rotor 39 is driven by the driving force to rotate in the direction A toward the valve-opening position against the spring force of the return spring 22. The valve body 8 is thus moved toward the full open position.

In FIGS. 6, reference numeral 43 denotes a lever-shaped stopper fixed to the valve shaft 5. The stopper 43 restricts the rotating motion of the valve shaft 5 by contacting the adjusting screw 24 shown in FIG. 8. The valve body 8 is then placed in the closed position. The valve body 8 may be held in the full open position by the contact of the stopper 43 with the projection of the actuator casing 3 as explained in the first embodiment.

This embodiment can exhibit substantially same effects as those of the first embodiment. Further, in this embodiment, the respective outer and inner pole piece portions 36 and 37 of the outer and inner stator cores 34 and 35 can face the respective projecting portions 42 of the rotor core 40 over the area extending in a sufficient axial direction and the respective radial clearances therebetween can be desirably set. This can serve for reducing the radial dimension of the electromagnetic actuator 31.

Furthermore, upon energization of the coil 38, the magnetic flux radially extends between the respective pole piece portions 36 and 37 of the outer and inner stator cores 34 and 35 and the respective projecting portions 42 of the rotor core 40, so that the valve shaft 5 can be prevented from being undesirably displaced in the axial direction. In addition, the valve shaft 5 is prevented from being undesirably displaced in the radial direction using the general bearings 6 and 7. As a result, the radial clearance between the stator core 33 and the rotor core 40 can be held with high accuracy. This can serve for stabilizing the driving torque of the electromagnetic actuator 31 and the opening characteristics of the valve body 8.

Figure 10:
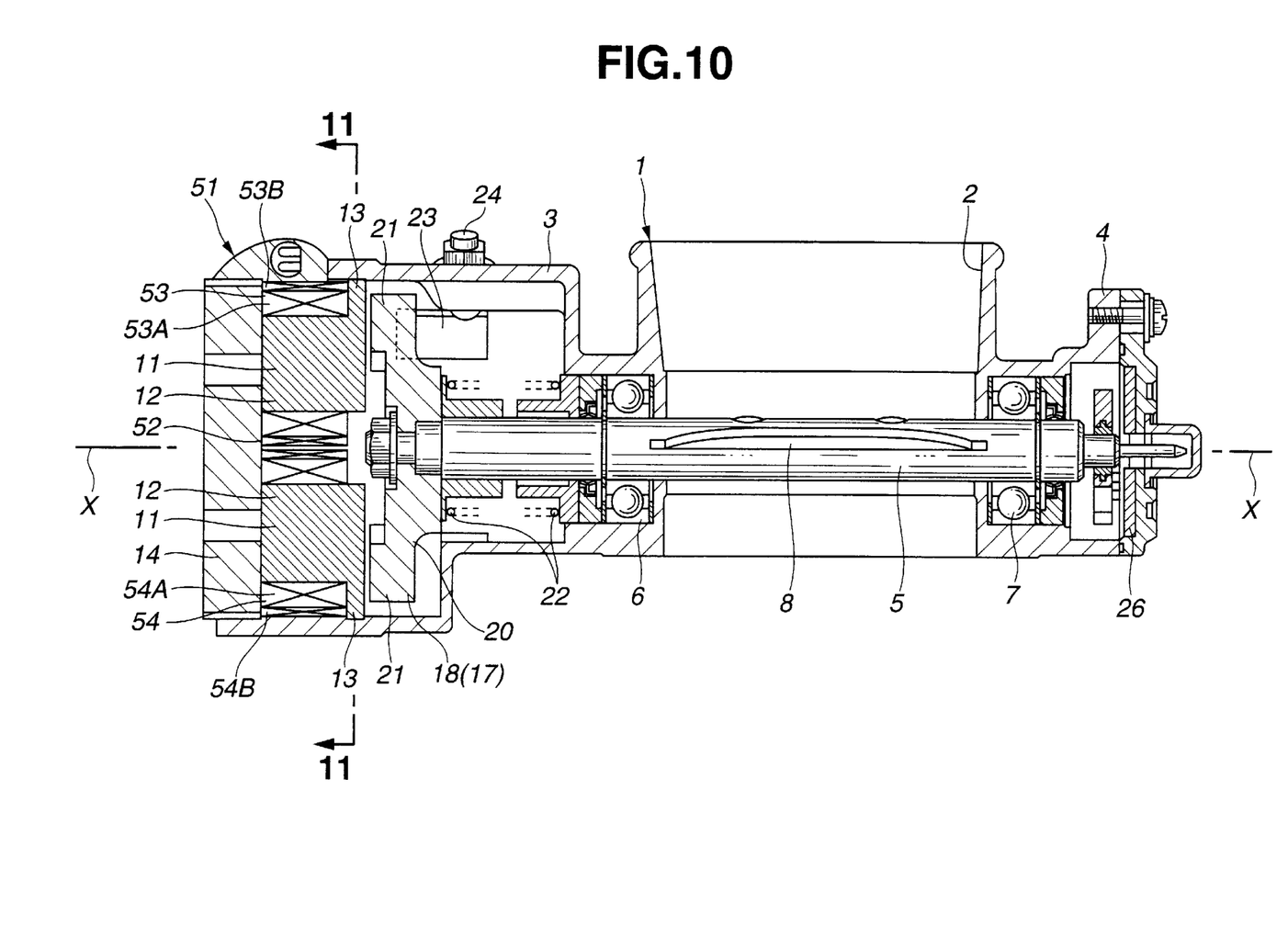
FIG. 10 is a section similar to FIG. 1, but showing the arrangement of a third embodiment, according to the present invention.
Figure 11:
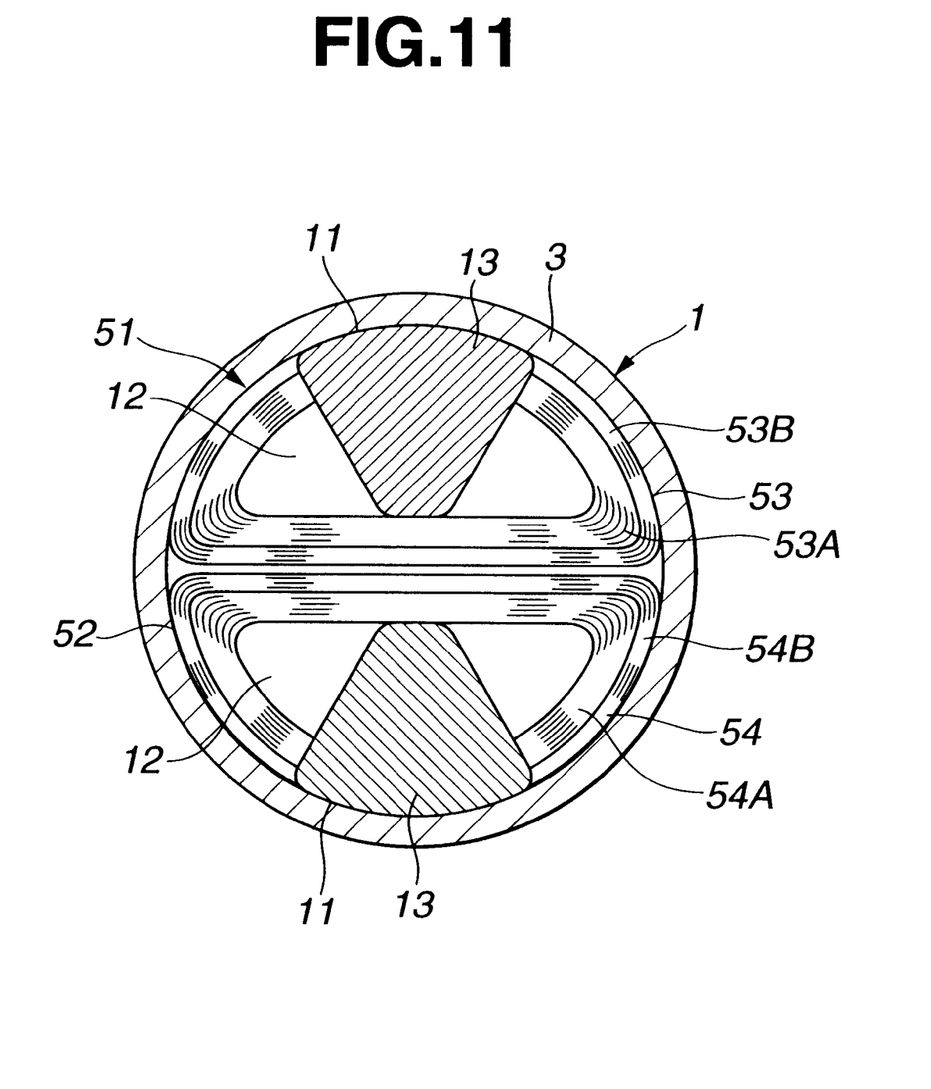
FIG. 11 is a cross section taken along the line 11—11 in FIG. 10, showing a stator.

Referring now to FIGS. 10 and 11, the third embodiment of the arrangement of the present invention is explained. Like reference numerals denote like parts and therefore detailed explanations therefor will be omitted. The third embodiment differs from the above first embodiment in the arrangement of the coil of the stator.

As illustrated in FIG. 10, an electromagnetic actuator 51 includes a stator 52 axially spaced from the rotor 17. The stator 52 includes a pair of stator cores 11, 11 and a pair of coils 53 and 54 wound on the coil mounting portions 12, 12 of the stator cores 11, 11, respectively. The coil 53 includes a main coil 53A energized for normal actuation of the throttle valve and an auxiliary or backup coil 53B energized for assisting the main coil 53A upon the main coil 53A failing to be energized, for instance, the main coil 53A being broken. The main coil 53A has a higher compactness and a higher winding density than those of the coil 15 of the first embodiment, in which the winding number of the main coil 53A is substantially the same as the winding number of the coil 15. The auxiliary coil 53B is wound around the main coil 53A as shown in FIG. 11, in the same winding direction as that of the main coil 53A and has a predetermined winding number smaller than the winding number of the main coil 53A. These coils 53A and 53B are connected in parallel to each other with the engine control unit.

The coil 54 has a structure similar to the coil 53, including a main coil 54A and an auxiliary or backup coil 54B wound on the main coil 54A as shown in FIG. 11. The coils 54A and 54B are wound in a direction opposite to the direction of the coils 53A and 53B. The winding number of the auxiliary coil 54B is a predetermined winding number smaller than that of the main coil 54A. The predetermined winding number of each auxiliary coil 53B and 54B is set so as to generate the driving torque for holding the valve body 8 in a predetermined backup open position even when only the auxiliary coils 53B and 54B are energized because of the occurrence of troubles such as breakage of the main coils 53A and 54A. The predetermined backup open position is an intermediate open position to ensure such a minimum intake air amount as required for driving the vehicle to a repair shop upon any incidental trouble happening.

During the engine operation, the engine control unit energizes the main coils 53A and 54A of the electromagnetic actuator 51 to move the valve body 8 between the closed position and the full open position for variable control of the intake air amount, depending on an amount of manipulation of the accelerator. The engine control unit also monitors current or voltage induced in the auxiliary coils 53B and 54B by the energization of the main coils 53A and 54A. The engine control unit determines breakage of the auxiliary coils 53B and 54B on the basis of the monitoring results. Further, the engine control unit determines breakage of the main coils 53A and 54A using detection results of the throttle sensor 26. If the breakage of the main coils 53A and 54A is determined, then the engine control unit starts to energize the auxiliary coils 53B and 54B. As a result, the valve body 8 is held in the backup open position so that the vehicle is shifted to the backup driving state.

The third embodiment can exhibit substantially the same effects as those of the above first embodiment. In addition, the auxiliary coils 53B and 54B in this embodiment can hold the valve body 8 in the backup open position even when the main coils 53A and 54A fail to be energized due to any trouble such as breakage. This can increase reliability of the actuator arrangement. Further, the arrangement of this embodiment can be structurally simplified as compared with an arrangement in which any other mechanical structure for holding the valve body 8 in the backup open position is disposed within the casing 1. Furthermore, diagnosis of trouble in the auxiliary coils 53B and 54B can be conducted by monitoring the current or voltage induced in the auxiliary coils 53B and 54B upon the energization of the main coils 53A and 54A.

Meanwhile, the arrangement of the projecting portions is not limited to the projecting portions 21 and 42 of the rotor cores 18 and 40 of the above embodiments. The projecting portions may be arranged in the stator cores such that at least a part of each projecting portion is opposed to the corresponding portion of the rotor core.

Further, the coil 38 of the second embodiment may be constituted by a pair of separate coils such as the main and auxiliary coils 53 and 54 of the third embodiment.

What is claimed is:

1. A rotary valve actuator arrangement, comprising:
    a casing having an intake air passage;
    a rotary valve disposed within said casing, said rotary valve including a valve shaft rotatable about an axis and a valve body disposed on said valve shaft and rotatable therewith to open and close the intake air passage, said valve body having a closed position and a full open position; and
    an electromagnetic actuator moving said valve body toward the full open position, said electromagnetic actuator including a stator core, a coil wound on said stator core, and a rotor opposed to said stator, said rotor being fixed to said valve shaft, said rotor having a valve-closing position corresponding to the closed position of said valve body and a valve-opening position corresponding to the full open position of said valve body;
    said stator core and said rotor cooperating to generate a magnetic field passing therethrough upon said coil being energized, said rotor being rotatably moved toward the valve-opening position by a magnetic attraction caused by the magnetic field.

2. A rotary valve actuator arrangement as claimed in claim 1, wherein said stator core has a first surface and said rotor has a second surface, one of said first and second surfaces being at least partly opposed to the other of said first and second surfaces to define an area through which the magnetic field passes, said rotor rotating in such one direction that said area continuously increases upon energization of said coil.

3. A rotary valve actuator arrangement as claimed in claim 2, wherein said one of said first and second surfaces extends in a radial direction perpendicular to said axis and has a generally part-sectorial shape tapered in said one direction.

4. A rotary valve actuator arrangement as claimed in claim 3, wherein said one of said first and second surfaces includes one end having a first radial length and an opposite end having a second radial length greater than the first radial length, said one end being opposed to said the other of said first and second surfaces with an axial clearance when said rotor is placed in the valve-closing position.

5. A rotary valve actuator arrangement as claimed in claim 2, wherein said one of said first and second surfaces has a generally part-cylindrical shape extending circumferentially over a first angle about said axis and tapered in said one direction.

6. A rotary valve actuator arrangement as claimed in claim 5, wherein said one of said first and second surfaces includes one circumferential end having a first axial length and an opposite circumferential end having a second axial length greater than the first axial length, said one circumferential end being opposed to said the other of said first and second surfaces with a radial clearance when said rotor is placed in the valve-closing position.

7. A rotary valve actuator arrangement as claimed in claim 5, wherein said the other of said first and second surfaces has a part-cylindrical shape extending circumferentially over a second angle smaller than said first angle about said axis.

8. A rotary valve actuator arrangement as claimed in claim 1, wherein said rotor includes a stopper limiting the rotation of said rotor in at least one of the valve-closing and valve-opening positions.

9. A rotary valve actuator arrangement as claimed in claim 8, wherein said casing includes a second stopper associating with the first stopper.

10. A rotary valve actuator arrangement as claimed in claim 1, further comprising a spring biasing said rotor toward the valve-closing position.

11. A rotary valve actuator arrangement as claimed in claim 1, wherein said rotor includes a plurality of projecting portions defining said second surface.

12. A rotary valve actuator arrangement as claimed in claim 11, wherein said rotor includes a pair of projecting portions diametrically opposed to each other with respect to said axis.

13. A rotary valve actuator arrangement as claimed in claim 1, wherein said stator core includes a plurality of cores defining said first surface.

14. A rotary valve actuator arrangement as claimed in claim 13, wherein said stator core includes a pair of cores diametrically opposed to each other with respect to said axis.

15. A rotary valve actuator arrangement as claimed in claim 13, wherein said coil includes a plurality of coils wound on the plurality of cores, respectively.

16. A rotary valve actuator arrangement as claimed in claim 15, wherein each of said plurality of coils includes a main coil and an auxiliary coil wound around said main coil, a winding number of said auxiliary coil being smaller than a winding number of said main coil.

17. A rotary valve actuator arrangement as claimed in claim 13, wherein said stator core includes a pair of generally cylindrical inner and outer cores radially spaced from each other.

18. A rotary valve actuator arrangement as claimed in claim 17, wherein said coil is disposed between the pair of inner and outer cores.

19. A rotary valve actuator arrangement as claimed in claim 18, wherein said coil includes a main coil and an auxiliary coil wound around said main coil, a winding number of said auxiliary coil being smaller than a winding number of said main coil.

20. A rotary valve actuator arrangement as claimed in claim 1, wherein each of said stator core and said rotor is made of a soft magnetic material.

21. A rotary valve actuator arrangement, comprising:
a rotary valve including a valve shaft rotatable about an axis and a valve body disposed on said valve shaft for unitary rotation therewith, said valve body having a closed position and a full open position; and
an electromagnetic actuator actuating said rotary valve, said electromagnetic actuator comprising:
a coil;
a stator core supporting said coil and having a first surface; and
a rotor rotatable about said axis between a valve-closing position corresponding to the closed position of said valve body and a valve-opening position corresponding to the full open position of said valve body, said rotor having a second surface opposed to said first surface to define a continuously variable area that forms a magnetic path upon energization of the coil.

22. A rotary valve actuator arrangement as claimed in claim 21, wherein said rotor is driven to rotate in such one direction that the variable area gradually increases.

23. A rotary valve actuator arrangement as claimed in claim 22, wherein one of said first and second surfaces is tapered in said one direction.

24. A rotary valve actuator arrangement as claimed in claim 23, wherein said one of said first and second surfaces extends in a radial direction perpendicular to said axis and has a generally part-sectorial shape, said one of said first and second surfaces including one end having a first radial length and an opposite end having a second radial length greater than the first radial length, said one end being opposed to the other of said first and second surfaces with an axial clearance when said rotor is placed in the valve-closing position.

25. A rotary valve actuator arrangement as claimed in claim 24, wherein said the other of said first and second surfaces has a generally sectorial shape extending in a radial direction perpendicular to said axis, said the other of said first and second surfaces including opposed ends having same radial length.

26. A rotary valve actuator arrangement as claimed in claim 25, wherein said first and second surfaces have central angles about said axis, respectively, said one of said first and second surfaces being larger than the central angle of said the other of said first and second surfaces.

27. A rotary valve actuator arrangement as claimed in claim 23, wherein said one of said first and second surfaces has a generally part-cylindrical shape extending circumferentially over a first angle about said axis, said one of said first and second surfaces including one circumferential end having a first axial length and an opposite circumferential end having a second axial length greater than the first axial length, said one circumferential end being opposed to the other of said first and second surfaces when said rotor is placed in the valve-closing position.

28. A rotary valve actuator arrangement as claimed in claim 27, wherein said the other of said first and second surfaces has a part-cylindrical shape extending circumferentially over a second angle about said axis, said the other of said first and second surfaces including opposed circumferential ends having same axial length.

29. A rotary valve actuator arrangement as claimed in claim 28, wherein said second angle is smaller than said first angle.

30. A rotary valve actuator arrangement as claimed in claim 21, wherein said rotor includes a stopper limiting the rotation of said rotor in at least one of the valve-closing and valve-opening positions.

31. A rotary valve actuator arrangement as claimed in claim 21, further comprising a spring biasing said rotor toward the valve-closing position.

32. A rotary valve actuator arrangement as claimed in claim 30, further comprising a casing accommodating said rotary valve, said casing including a second stopper associating with the first stopper.

33. A rotary valve actuator arrangement as claimed in claim 21, wherein said rotor includes a plurality of projecting portions defining said second surface.

34. A rotary valve actuator arrangement as claimed in claim 33, wherein said rotor includes a pair of projecting portions diametrically opposed to each other with respect to said axis.

35. A rotary valve actuator arrangement as claimed in claim 21, wherein said stator core includes a plurality of cores defining said first surface.

36. A rotary valve actuator arrangement as claimed in claim 35, wherein said stator core includes a pair of cores diametrically opposed to each other with respect to said axis.

37. A rotary valve actuator arrangement as claimed in claim 35, wherein said coil includes a plurality of coils wound on the plurality of cores, respectively.

38. A rotary valve actuator arrangement as claimed in claim 37, wherein each of said plurality of coils includes a main coil and an auxiliary coil wound around said main coil, a winding number of said auxiliary coil being smaller than a winding number of said main coil.

39. A rotary valve actuator arrangement as claimed in claim 35, wherein said stator core includes a pair of generally cylindrical inner and outer cores radially spaced from each other.

40. A rotary valve actuator arrangement as claimed in claim 39, wherein said coil is disposed between the pair of inner and outer cores.

41. A rotary valve actuator arrangement as claimed in claim 40, wherein said coil includes a main coil and an auxiliary coil wound around said main coil, a winding number of said auxiliary coil being smaller than a winding number of said main coil.

42. A rotary valve actuator arrangement as claimed in claim 21, wherein each of said stator core and said rotor is made of a soft magnetic material.

* * * * *